United States Patent
Konanka et al.

(10) Patent No.: US 7,725,737 B2
(45) Date of Patent: May 25, 2010

(54) SYSTEM AND METHODOLOGY PROVIDING SECURE WORKSPACE ENVIRONMENT

(75) Inventors: Dzmitry Konanka, Minsk (BY); Andrei Liahuski, Minsk (BY)

(73) Assignee: Check Point Software Technologies, Inc., Redwood City, CA (US)

(*) Notice: Subject to any disclaimer, the term of this patent is extended or adjusted under 35 U.S.C. 154(b) by 1258 days.

(21) Appl. No.: 11/163,343

(22) Filed: Oct. 14, 2005

(65) Prior Publication Data

US 2007/0101435 A1    May 3, 2007

(51) Int. Cl.
G06F 21/22 (2006.01)
H04L 9/00 (2006.01)
G06F 9/44 (2006.01)

(52) U.S. Cl. ............... 713/190; 726/1; 726/27; 719/328; 713/100

(58) Field of Classification Search ............ None
See application file for complete search history.

(56) References Cited

U.S. PATENT DOCUMENTS

| | | | |
|---|---|---|---|
| 5,893,099 A | 4/1999 | Schreiber et al. | |
| 5,974,549 A * | 10/1999 | Golan | 726/23 |
| 5,987,611 A | 11/1999 | Freund | |
| 6,189,032 B1 | 2/2001 | Susaki et al. | |
| 6,321,334 B1 | 11/2001 | Jerger et al. | |
| 6,345,361 B1 | 2/2002 | Jerger et al. | |
| 6,366,912 B1 | 4/2002 | Wallent et al. | |
| 6,529,938 B1 | 3/2003 | Cochran et al. | |
| 6,728,698 B2 | 4/2004 | Yen et al. | |
| 6,735,703 B1 * | 5/2004 | Kilpatrick et al. | 726/23 |
| 6,742,039 B1 | 5/2004 | Remer et al. | |
| 6,742,124 B1 * | 5/2004 | Kilpatrick et al. | 726/23 |
| 6,745,367 B1 | 6/2004 | Bates et al. | |
| 6,795,856 B1 | 9/2004 | Bunch | |
| 6,850,943 B2 | 2/2005 | Teixeira et al. | |
| 6,931,446 B1 | 8/2005 | Cox et al. | |
| 6,944,772 B2 | 9/2005 | Dozortsev | |
| 7,010,807 B1 | 3/2006 | Yanovsky | |
| 7,069,586 B1 * | 6/2006 | Winneg et al. | 726/16 |
| 7,085,928 B1 | 8/2006 | Schmid et al. | |
| 7,093,239 B1 | 8/2006 | van | |
| 7,136,860 B2 | 11/2006 | Doliov | |
| 7,146,638 B2 | 12/2006 | Malcolm | |
| 7,162,715 B1 | 1/2007 | Whittaker et al. | |
| 7,165,076 B2 | 1/2007 | Bentley | |
| 7,165,269 B2 * | 1/2007 | Winneg et al. | 726/16 |
| 7,171,693 B2 * | 1/2007 | Tucker et al. | 726/26 |
| 7,178,166 B1 | 2/2007 | Taylor et al. | |

(Continued)

Primary Examiner—Christopher A Revak
(74) Attorney, Agent, or Firm—John A. Smart

(57) ABSTRACT

System and methodology providing a secure workspace environment is described. In one embodiment, for example, in a computer system, a method is described for creating a secured workspace within an existing operating system for allowing users to run applications in a secured manner, the method comprises steps of: creating a policy for configuring the secured workspace, the policy specifying how information created during operation of the applications may be accessed; hooking particular functions of the operating system in order to obtain control over the information created during operation of the applications; during operation of the applications, encrypting the information to prevent unauthorized access; in response to a request for access to the information, determining whether the request complies with the policy; and if the request complies with the policy, satisfying the request by providing access to a decrypted copy of the information.

45 Claims, 6 Drawing Sheets

U.S. PATENT DOCUMENTS

| | | |
|---|---|---|
| 7,181,603 B2 * | 2/2007 | Rothrock et al. ............... 713/1 |
| 7,185,015 B2 | 2/2007 | Kester et al. |
| 7,194,464 B2 | 3/2007 | Kester et al. |
| 7,203,656 B2 | 4/2007 | Lotvin et al. |
| 7,222,359 B2 | 5/2007 | Freund et al. |
| 7,237,125 B2 | 6/2007 | Raley et al. |
| 7,237,264 B1 | 6/2007 | Graham et al. |
| 7,249,188 B2 | 7/2007 | Spicer et al. |
| 7,260,840 B2 | 8/2007 | Swander et al. |
| 7,272,625 B1 | 9/2007 | Hannel et al. |
| 7,278,163 B2 | 10/2007 | Banzhof et al. |
| 7,305,470 B2 | 12/2007 | Tom et al. |
| 7,308,703 B2 | 12/2007 | Wright et al. |
| 7,308,711 B2 | 12/2007 | Swander et al. |
| 7,315,890 B2 | 1/2008 | Tilton et al. |
| 7,316,029 B1 | 1/2008 | Parker et al. |
| 7,318,237 B2 | 1/2008 | Moriconi et al. |
| 7,325,026 B1 | 1/2008 | North |
| 7,330,712 B2 | 2/2008 | Kirkup et al. |
| 7,337,219 B1 | 2/2008 | Meenan et al. |
| 7,340,770 B2 | 3/2008 | Freund |
| 7,340,772 B2 | 3/2008 | Panasyuk et al. |
| 7,340,776 B2 | 3/2008 | Zobel et al. |
| 2004/0034794 A1 | 2/2004 | Mayer |
| 2006/0075106 A1 | 4/2006 | Hochmuth et al. |
| 2006/0075260 A1 * | 4/2006 | Tucker et al. ............... 713/190 |
| 2007/0128899 A1 | 6/2007 | Mayer |
| 2007/0130458 A1 | 6/2007 | Focke et al. |
| 2007/0192864 A1 * | 8/2007 | Bryant et al. ............... 726/23 |
| 2008/0040795 A1 * | 2/2008 | Winneg et al. ............... 726/16 |
| 2008/0109886 A1 * | 5/2008 | Matsumoto et al. ............ 726/5 |

* cited by examiner

SYSTEM AND METHODOLOGY PROVIDING SECURE WORKSPACE ENVIRONMENT

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

Computer Program Listing Appendix under Sec. 1.52(e): This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.

Object Description: SourceCode.txt, size: 269762 Bytes, created: Sep. 13, 2005 11:28:32 AM; Object ID: File No. 1; Object Contents: Source code.

BACKGROUND OF INVENTION

1. Field of the Invention

The present invention relates generally to computers and data processing applications and, more particularly, to system and methodology providing a secure workspace environment.

2. Description of the Background Art

Growth of Internet-based remote access technologies has lead to an increasing number of users working in unprotected or untrusted environments. Home users connect to their corporate networks via different VPN clients. People on vacations check their emails via public kiosks. Sales agents connect to their databases via wireless services in airports. Large networks now are not just broadband lines that connect offices in several states or countries, they are far more complicated and far less controlled at the end-points (e.g., at individual personal computers). As the number of mobile users grows, the number of potential threats also grows. Potential threads include, but are not limited to, phishing attacks, identity theft, trade secrets theft, and the like.

A network of the typical large organization can be protected with various tools. For example, a firewall is installed to protect a company's gateway. Anti-virus software is installed on the company's mail server to scan incoming and outgoing email. Anti-virus software can be also installed on individual end user computers. For remote users, SSL VPN or IPSEC VPN is available to connect to the company's network from remote sites. For managing these environments, IT departments typically develop and deploy a set of security rules (security policy) to endpoints. Notwithstanding the availability of these foregoing tools, corporate IT departments still face a complex problem: how to ensure confidentiality of the sessions when users connect to their corporate networks from untrusted end-points, end-points that cannot be controlled by IT departments.

Consider VPN, for instance. Existing VPN solutions provide a mechanism to encrypt the traffic between a given end-point and corporate gateway. However, these schemes can be easily broken on the end-point, thus providing the attacker with access to the end-point computer before, during, or after the session. For example, the attacker can install keyboard monitoring (keylogger) software and monitor all user activities. The attacker is then able to spoof the user's credentials (user name and password). Also, the attacker may analyze the cache of the user's web browser, and thus retrieve information about what sites were visited by the user and reveal all other session information. The attacker may also analyze the files that remain after the session is complete. For example, the attacker may analyze files used by the user's computer operating system (e.g., Microsoft Windows), including analyzing the user's profile present in temporary folders. Similarly, the attacker may analyze files used by various applications, such as Microsoft Word, Microsoft Excel, and Adobe Acrobat—files that were left by the user after the session completed. All told, the basic problem that remains today is how to create a secure environment within untrusted end-points, such as web kiosks or home computers.

There have been some attempts to try to address this problem. For convenience, they can be divided into several categories from an architectural and technological point of view: (1) Policy enforcement; (2) Virtual operating system (OS); and (3) Secure environment within existing OS. Each will be examined in greater detail.

Policy Enforcement

Before the secure session between the end-point and company gateway is established, a small application, let us call it the "Enforcement Agent" (EA), is downloaded to the end-point computer. The EA can be implemented as an Active X component that can be launched by the Internet Explorer browser, or it can be a java application, or even a tiny executable (e.g., downloaded to the user's computer). In operation, the EA checks the endpoint computer for compliance with a policy. A typical policy can be, for example, include requirements that the end-point (requesting a session) must have Windows XP or newer Microsoft Operating system installed, must have ZoneAlarm® firewall installed, must have antivirus installed (e.g., McAfee or Norton), and must have no known malware installed. If the end-point does not comply with these policy requirements, the EA reports to the gateway that the given end-point is not compliant and the user will not be able to login to the company's network. In such a case, the user must install the requisite software or find another computer that meets the policy requirements.

Virtual OS

A virtual OS (operating system) solution attempts to create a virtual, more-secure operating system inside an untrusted operating system on the end-point. A typical solution would be to create a portable USB device with preinstalled and preconfigured Linux OS. Linux is booted from the USB device and all session data and temporary files are saved to the USB device. The preconfigured Linux USB device has all necessary software installed: VPN client, email client, spreadsheet application and word processor, for example.

Secure Environment

The goal of this solution is to create a secure environment using the underlying operating system or an application. For example, an Internet Explorer browser plug-in (so-called "BHO") could conceivably be developed that is able to encrypt all Internet Explorer session data, including cookie, cache, and temporary files. In this case, when the user accesses web sites or web applications from such protected browser, all session data is encrypted and not accessible to the attacker.

Each attempt described above provides a real world solution that poses serious barriers for the attacker, and thus there are many commercial products that utilize these concepts. However, each of the attempts, while it provides a serious barrier for the attacker, either can be bypassed or has serious drawbacks. For example, although policy enforcement is a must-have solution for every end-point, it is not sustainable to targeted attacks. An attacker can take popular keylogger software and modify it so that popular antivirus or antispyware products will not be able to detect it. Another significant drawback of policy enforcement is that it does not delete temporary session data that can be analyzed by the attacker afterwards.

The virtual OS solution is inconvenient at best, as it does not give the user a chance to work with the applications that he or she normally works with: Internet Explorer, Microsoft Word, Excel, or Adobe Acrobat. As a result, the solution incurs a significant learning curve for the user and an increased amount of troubleshooting and support for IT departments. Furthermore, the physical requirements of the approach are problematic. Not all kiosks will allow access to plug-in USB devices or boot from them.

Currently, all existing prior art solutions for providing a secure environment either can be easily bypassed or are oriented to provide only limited protection (e.g., of certain application, such as a plug-in for Internet Explorer). Accordingly, a better solution is sought.

SUMMARY OF INVENTION

System and methodology providing a secure workspace environment is described. In one embodiment, for example, in a computer system, a method of the present invention is described for creating a secured workspace within an existing operating system for allowing users to run applications in a secured manner, the method comprises steps of: creating a policy for configuring the secured workspace, the policy specifying how information created during operation of the applications may be accessed; hooking particular functions of the operating system in order to obtain control over the information created during operation of the applications; during operation of the applications, encrypting the information to prevent unauthorized access; in response to a request for access to the information, determining whether the request complies with the policy; and if the request complies with the policy, satisfying the request by providing access to a decrypted copy of the information.

In another embodiment, for example, a computer system of the present invention providing a secured workspace for allowing users to run applications in a secured manner is described that comprises: a computer running under control of an existing operating system; a policy for configuring the secured workspace, the policy specifying how information created during operation of the applications may be accessed; a module for intercepting particular functions of the existing operating system in order to allow the secured workspace to run under the existing operating system, the module permitting the secured workspace to obtain control over the information created during operation of the applications; an encryption module for preventing unauthorized access to the information; and a decryption module for providing authorized access to the information, in response to receiving a request that complies with the policy.

In yet another embodiment, for example, a system of the present invention providing a secured desktop environment that allows users to run application software securely is described that comprises: a computer running under an operating system, the computer including application software for use by users; and a secured desktop environment comprising: a configurable policy specifying permitted operations of the application software and specifying permitted access to information created during operation of the application software; a hooks engine for intercepting particular calls to the operating system, thereby allowing the secured desktop environment to control operations of the application software and control access to information created during operation of the application software; and a module, operating in conjunction with the policy and the hooks engine, for preventing any operation of the application software that is not permitted and/or any access to the information that is not permitted.

In another embodiment, for example, a method of the present invention is described for securing software programs that run under control of a computer operating system, the method comprises steps of: defining a configurable security policy that specifies operations of the software programs that are permitted; patching certain files of the computer operating system, so that interactions between the software programs and the computer operating system may be monitored for compliance with the security policy; and controlling operations of the software programs to prevent violation of the security policy.

In still another embodiment, for example, a system of the present invention for securing software programs that run under control of a computer operating system is described that comprises: a configurable security policy that specifies operations of the software programs that are permitted; means for patching certain files of the computer operating system, so that interactions between the software programs and the computer operating system may be monitored for compliance with the security policy; and means for controlling operations of the software programs to prevent violation of the security policy.

In another embodiment, for example, an improved desktop environment for use with an existing operating system is described, wherein the improvement comprises: a policy specifying behavior of computer programs that is permitted; injectable program code that intercepts interactions between the computer programs and the existing operating system, so that the computer programs may be monitored for compliance with the policy; and wherein the desktop environment blocks any attempted behavior by the computer programs that would violate the policy.

DETAILED DESCRIPTION

Glossary

Figure 1:
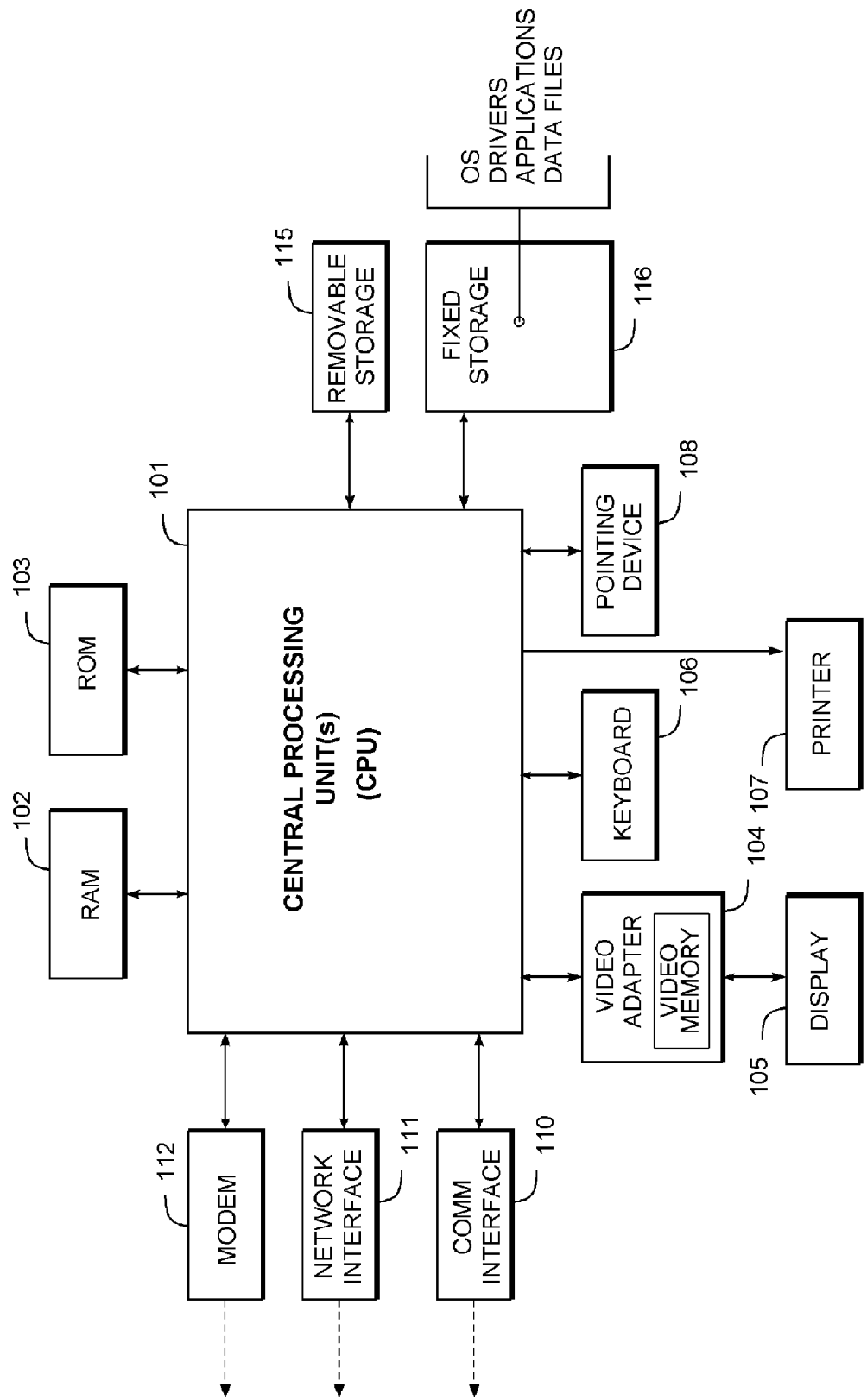
FIG. 1 is a very general block diagram of a computer system (e.g., an IBM-compatible system) in which software-implemented processes of the present invention may be embodied.

The following definitions are offered for purposes of illustration, not limitation, in order to assist with understanding the discussion that follows.

Firewall: A firewall is a set of related programs, typically located at a network gateway server, that protects the resources of a private network from other networks by controlling access into and out of the private network. (The term also implies the security policy that is used with the programs.) A firewall, working closely with a router program, examines each network packet to determine whether to forward it toward its destination. A firewall may also include or work with a proxy server that makes network requests on behalf of users. A firewall is often installed in a specially designated computer separate from the rest of the network so that no incoming request directly accesses private network resources.

HTTP: HTTP is the acronym for HyperText Transfer Protocol, which is the underlying communication protocol used by the World Wide Web on the Internet. HTTP defines how messages are formatted and transmitted, and what actions Web servers and browsers should take in response to various commands. For example, when a user enters a URL in his or her browser, this actually sends a HTTP command to the Web server directing it to fetch and transmit the requested Web page. Further description of HTTP is available in "RFC 2616: Hypertext Transfer Protocol—HTTP/1.1," the disclosure of which is hereby incorporated by reference. RFC 2616 is available from the World Wide Web Consortium (W3C), and is available via the Internet (e.g., currently at www.w3.org/Protocols/). Additional description of HTTP is available in the technical and trade literature, see e.g., Stallings, W., "The Backbone of the Web," BYTE, October 1996, the disclosure of which is hereby incorporated by reference.

Network: A network is a group of two or more systems linked together. There are many types of computer networks, including local area networks (LANs), virtual private networks (VPNs), metropolitan area networks (MANs), campus area networks (CANs), and wide area networks (WANs) including the Internet. As used herein, the term "network" refers broadly to any group of two or more computer systems or devices that are linked together from time to time (or permanently).

Portal: A portal provides an individualized or personalized view of multiple resources (e.g., Web sites) and services. A portal typically offers a single access point (e.g., browser page) providing access to a range of information and applications. A portal assembles information from a number of different sources (e.g., Web sites and applications) enabling a user to quickly receive information without having to navigate to a number of different Web sites. A portal also typically enables a user to obtain a personalized view of information and applications by organizing and grouping information and services for presentation to users.

TCP/IP: TCP/IP stands for Transmission Control Protocol/Internet Protocol, the suite of communications protocols used to connect hosts on the Internet. TCP/IP uses several protocols, the two main ones being TCP and IP. TCP/IP is built into the UNIX operating system and is used by the Internet, making it the de facto standard for transmitting data over networks. For an introduction to TCP/IP, see e.g., "RFC 1180: A TCP/IP Tutorial", the disclosure of which is hereby incorporated by reference. A copy of RFC 1180 is available via the Internet (e.g., currently at www.ietf.org/rfc/rfc1180.txt).

Thread: A thread refers to a single sequential flow of control within a program. Operating systems that support multi-threading enable programmers to design programs whose threaded parts can execute concurrently. In some systems, there is a one-to-one relationship between the task and the program, but a multi-threaded system allows a program to be divided into multiple tasks. Multi-threaded programs may have several threads running through different code paths simultaneously.

URL: URL is an abbreviation of Uniform Resource Locator, the global address of documents and other resources on the World Wide Web. The first part of the address indicates what protocol to use, and the second part specifies the IP address or the domain name where the resource is located.

Winsock: Windows Sockets 2 (Winsock) is a Microsoft-provided interface that enables programmers to create advanced Internet, intranet, and other network-capable applications to transmit application data across the wire, independent of the network protocol being used. With Winsock, programmers are provided access to advanced Microsoft Windows networking capabilities such as multicast and Quality of Service (QOS). Winsock follows the Windows Open System Architecture (WOSA) model; it defines a standard service provider interface (SPI) between the application programming interface (API), with its exported functions and the protocol stacks. It uses the sockets paradigm that was first popularized by Berkeley Software Distribution (BSD) UNIX. It was later adapted for Windows in Windows Sockets 1.1, with which Windows Sockets 2 applications are backward compatible. Winsock programming was previously centered around TCP/IP. Some programming practices that worked with TCP/IP do not work with every protocol. As a result, the Windows Sockets 2 API adds functions where necessary to handle several protocols. For further information regarding Winsock, see e.g., "Winsock Reference", available from Microsoft Corporation, the disclosure of which is hereby incorporated by reference. A copy of this documentation is available via the Internet (e.g., currently at msdn.microsoft.com/library/default.asp?url=/library/en-us/winsock/winsock/winsock_reference.asp).

XML: XML stands for Extensible Markup Language, a specification developed by the World Wide Web Consortium (W3C). XML is a pared-down version of the Standard Generalized Markup Language (SGML), a system for organizing and tagging elements of a document. XML is designed especially for Web documents. It allows designers to create their own customized tags, enabling the definition, transmission, validation, and interpretation of data between applications and between organizations. For further description of XML, see e.g., "Extensible Markup Language (XML) 1.0", (2nd Edition, Oct. 6, 2000) a recommended specification from the W3C, the disclosure of which is hereby incorporated by reference. A copy of this specification is available via the Internet (e.g., currently at www.w3.org/TR/REC-xml).

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof.

Computer-based Implementation

Basic System Hardware and Software (e.g., for Desktop and Server Computers)

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP LaserJet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

A software system is typically provided for controlling the operation of the computer system 100. The software system, which is usually stored in system memory (RAM) 102 and on fixed storage (e.g., hard disk) 116, includes a kernel or operating system (OS) which manages low-level aspects of computer operation, including managing execution of processes, memory allocation, file input and output (I/O), and device I/O. The OS can be provided by a conventional operating system, such as Microsoft Windows 9x, Microsoft Windows NT, Microsoft Windows 2000, Microsoft Windows XP, or Microsoft Windows Vista (all available from Microsoft Corporation of Redmond, Wash.) or an alternative operating system, such as the previously mentioned operating systems. Typically, the OS operates in conjunction with device drivers (e.g., "Winsock" driver—Windows' implementation of a TCP/IP stack) and the system BIOS microcode (i.e., ROM-based microcode), particularly when interfacing with peripheral devices. One or more application(s), such as client application software or "programs" (i.e., set of processor-executable instructions), may also be provided for execution by the computer system 100. The application(s) or other software intended for use on the computer system may be "loaded" into memory 102 from fixed storage 116 or may be downloaded from an Internet location (e.g., Web server). A graphical user interface (GUI) is generally provided for receiving user commands and data in a graphical (e.g., "point-and-click") fashion. These inputs, in turn, may be acted upon by the computer system in accordance with instructions from OS and/or application(s). The graphical user interface also serves to display the results of operation from the OS and application(s).

The above-described computer hardware and software are presented for purposes of illustrating the basic underlying desktop and server computer components that may be employed for implementing the present invention. For purposes of discussion, the following description will present examples in which it will be assumed that there exists at least one computer that communicates with other computers over a network, such as one or more "clients" (e.g., desktop computers) that communicate with various "servers" (e.g., Web servers) over the Internet. The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Overview

In accordance with the present invention, a fully secured environment is provided in the framework of the user's usual operating system (host OS, such as Microsoft Windows). The main Input/Output (I/O) functions of the host OS are hooked or intercepted so that all information, including session information that applications save to disk, is really stored in encrypted form to prevent unauthorized access. In this manner, unauthorized or malicious users, even those that have full access to the host OS, are prevented from accessing the information or data created in the secured environment.

This process occurs in a fashion that is fully transparently for both applications and users. Applications think that they are working with usual OS functions and that they are storing information to usual storages. The user sees the secured environment as a "virtual desktop," a Secured Desktop. The user can easily switch between secured and not secured (usual) desktops, for example by hotkeys or GUI elements. By intercepting all (relevant) OS functions, the approach of the present invention can control all applications running on the Secured Desktop, allowing or denying them the ability to do any specified action. This approach is used in conjunction with a configurable security policy that specifies behavior or actions of software programs that are, or are not, permitted. For example, it is possible to specify what applications can be run on the virtual desktop at all. In this manner, the present invention may prevent the launching of any noncompliant software (i.e., computer programs that would violate the policy), including banning malicious software (e.g., spyware and computer viruses) that can steal information or even damage the system.

In the currently preferred embodiment, a Secure Workspace System (SWS) is provided that gives the user a secured area for web sessions, with a clear visual separation from non-secure areas. The workspace protects sensitive session information while a given session is active and performs total clean up after the session is finished. The workspace enables protection in user space mode, without developing device drivers (guest user rights are needed to run the Secure Workspace System). The workspace performs API hooking at the lowest possible level in the user space (e.g., native Windows NT API (NTDLL)), so that applications that work directly with this layer will not bypass the hooking mechanism.

System Components

The Secure Workspace System (SWS) works at the application level on the client side and prevents unauthorized access to a user's confidential information. The SWS creates a new secured, virtual desktop, which the user can work on, and intercepts file/registry operations for all applications started on this desktop. The system saves all sensitive user data on the user's local machine in encrypted form and deletes it when the session is terminated.

Figure 2A:
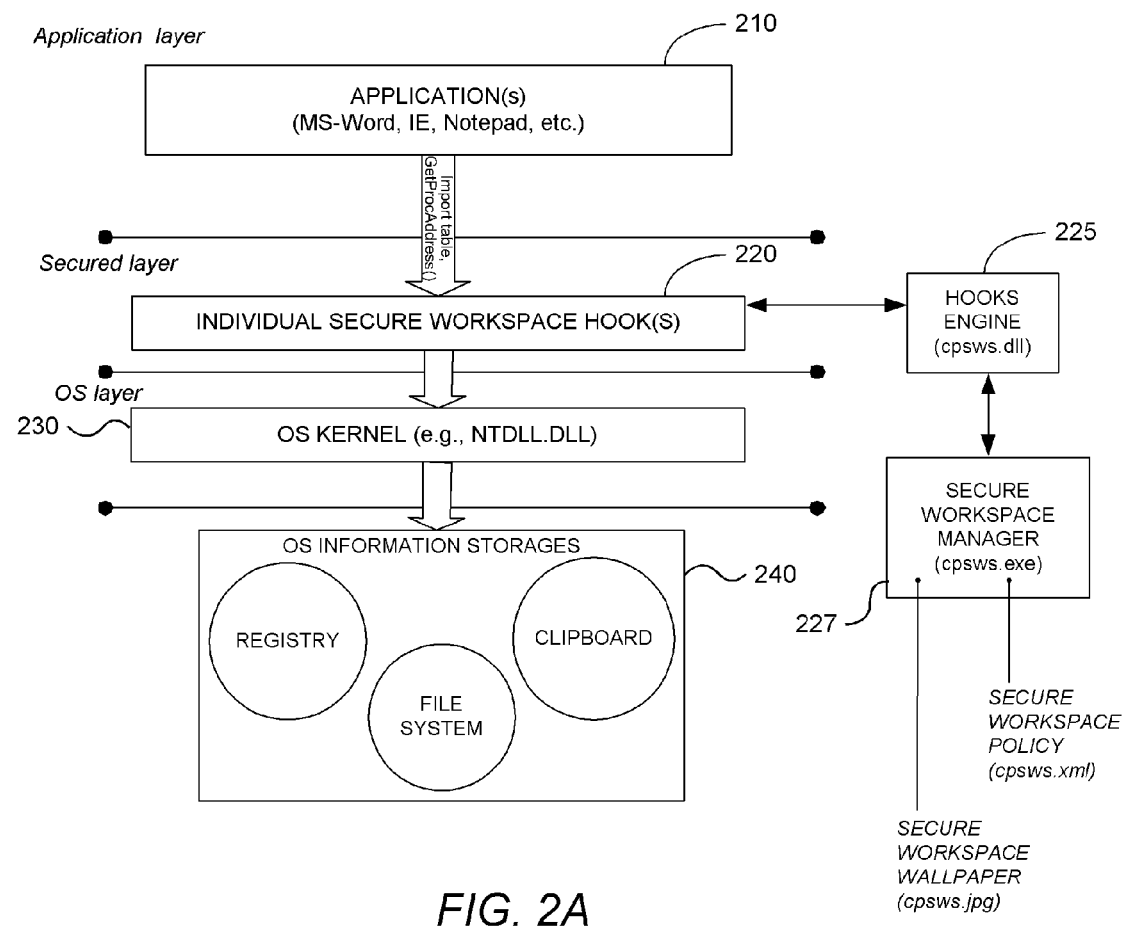
FIG. 2A is a high-level block diagram illustrating the Secure Workspace System (SWS) of the present invention.

FIG. 2A is a high-level block diagram illustrating the Secure Workspace System (SWS) of the present invention. As shown, the SWS 200 is a secure workspace or desktop environment that includes (main) application(s) 210; secure workspace hook(s) 220, hooks engine 225, and secure workspace manager 227. The secure workspace manager 227 is the main module for controlling and configuring the SWS. In operation, the manager 227 creates a new "secure" desktop and secure user profile, and initializes them according to a secure workspace policy. The policy (cpsws.xml) file allows one to specify the SWS look and feel (e.g., start menu, shortcuts, and the like), the list of applications that can be started on the secure workspace, and security settings for individual applications (e.g., access rights for folders, WinNT kernel objects, and the like). The workspace includes special displayable indicia, such as distinctive desktop wallpaper, that is displayed when the user switches into the secure workspace, thereby providing visual feedback that the user's system is operating in secure mode.

During operation, the manager 227 starts a usual Windows shell (e.g., explorer.exe) with an injection of the hooks engine 225 (cpsws.dll) on the created desktop. The injected hooks engine 225 in turn hooks "process creation" routines and automatically injects itself into all newly created processes. In this manner, each application 210 on the secure desktop receives a workspace hook 220. In the Microsoft Windows environment, for example, the injected DLL hooks API calls (invocations) by overwriting hooked NTDLL routines entry points with JMP instructions, thus redirecting them to code inside the cpsws.dll. In this fashion, the system can be assured that any kind of call to NTDLL API (including from Win32 DLL, and from the application itself with GetProcAddress or import table) will be first intercepted by the SWS. This allows the SWS 200 to control each application's interaction with the underlying operating system 230, including the operating system's information storage 240 (e.g., Windows' registry, file system, and Clipboard).

In the currently preferred embodiment, the hooks engine 225 monitors the following API functions:

---

ZwClose
    ZwQueryObject
    ZwQueryVolumeInformationFile
    ZwSetVolumeInformationFile
    ZwQueryQuotaInformationFile
    ZwSetQuotaInformationFile
    ZwDuplicateObject
    ZwCreateFile
    ZwOpenFile
    ZwDeleteFile
    ZwFlushBuffersFile
    ZwCancelIoFile
    ZwReadFile
    ZwReadFileScatter
    ZwWriteFile -continued

```
    ZwWriteFileGather
    ZwLockFile
    ZwUnlockFile
    ZwQueryAttributesFile
    ZwQueryFullAttributesFile
    ZwQueryInformationFile
    ZwSetInformationFile
    ZwQueryDirectoryFile
    ZwNotifyChangeDirectoryFile
    ZwFsControlFile
    ZwQueryEaFile
    ZwSetEaFile
    ZwCreateSection
    ZwOpenSection
    ZwQuerySection
    ZwExtendSection
    ZwMapViewOfSection
    ZwUnmapViewOfSection
    ZwAreMappedFilesTheSame
    ZwCreateProcess
    ZwOpenProcess
    ZwTerminateProcess
    ZwCreateMutant
    ZwOpenMutant
    ZwCreateSemaphore
    ZwOpenSemaphore
    ZwCreateEvent
    ZwOpenEvent
    CreateProcessW
  CreateProcessA
    WinExec
    ExitWindowsEx
    StartDocA
StartDocW
    ZwCreateKey
    ZwOpenKey.
CoGetClassObject
CoLoadLibrary
CoCreateInstance
CoCreateInstanceEx
SetClipboardData
GetClipboardData
```

Access to different system resources are allowed or denied based on the policy (cpsws.xml). The hooks engine 227 allows applications started on the secure desktop to create files and registry keys only inside a secure user profile. These items will be encrypted on the host file system and will be deleted when the given session is terminated.

Figure 2B:
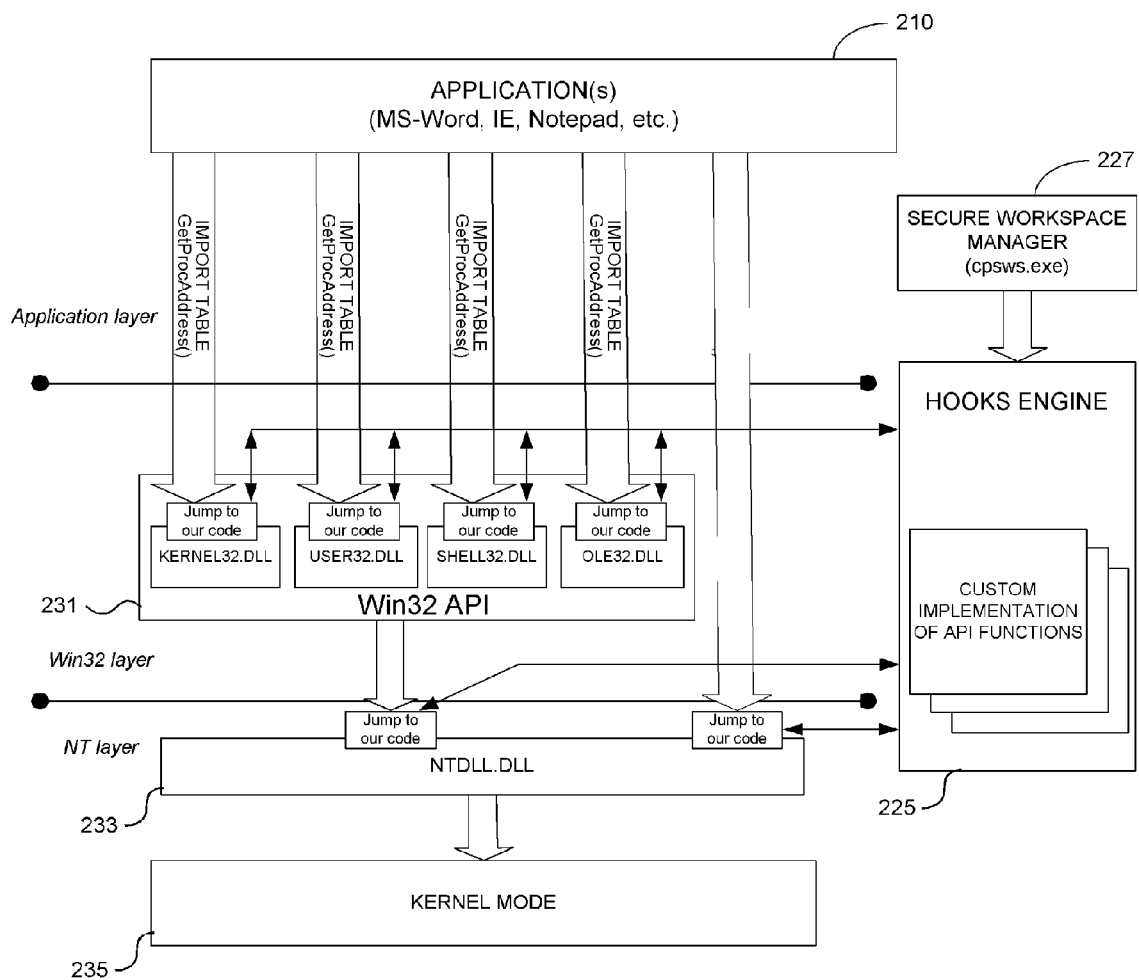
FIG. 2B is a block diagram providing a lower level view of the components of FIG. 2A.

FIG. 2B is a block diagram providing a lower level view of the components of FIG. 2A. (Components 210, 225, and 227 are shown carried over from FIG. 2A to FIG. 2B.) The specific operation of these components will now be described in further detail. As shown, the cpsws.dll is loaded into every secured process. During loading into a given target process, it writes small code stubs into (i.e., applies code patches to) the beginning of every necessary ntdll.dll exported function. The stub calls serve to dispatch or redirect function calls to routines contained in cpsws.dll, instead of the original ntdll functions.

As illustrated in the diagram, every loaded in-process module, including usual system modules such as kernel32.dll, shell32.dll, and the like (even main application executable), can communicate with the NT kernel via ntdll.dll calls. Use of the mechanism of ntdll.dll hooking allows maximum possible in user-space control of all data flows between a given secured application and hardware persistent storage. In this manner, the cpsws.dll can dispatch all files-related functions, including those used by the application. The cpsws.dll encrypts all data on-the-fly, and stores it to the target persistent storage in encrypted form.

The cpsws.dll also controls creation of out-of-process COM objects. It does this by hooking the particular ole32.dll functions that are used for object creation. It intercepts creating out-of-process COM servers and creates their processes itself. Some user32.dll functions, such as SetClipboardData and GetClipboardData, also may be hooked to allow on-the-fly encryption of data copied to clipboard by secured applications. In the currently preferred embodiment, additional kernel32.dll and shell32.dll functions are hooked to control process creation and file operations at a higher level. In this manner, the SWS may, for example, show user alert messages about rejected operations, including denied program startup, denied saving files to non-secured locations, and the like.

Initializing the Secure Desktop/Workspace

Figure 3A:
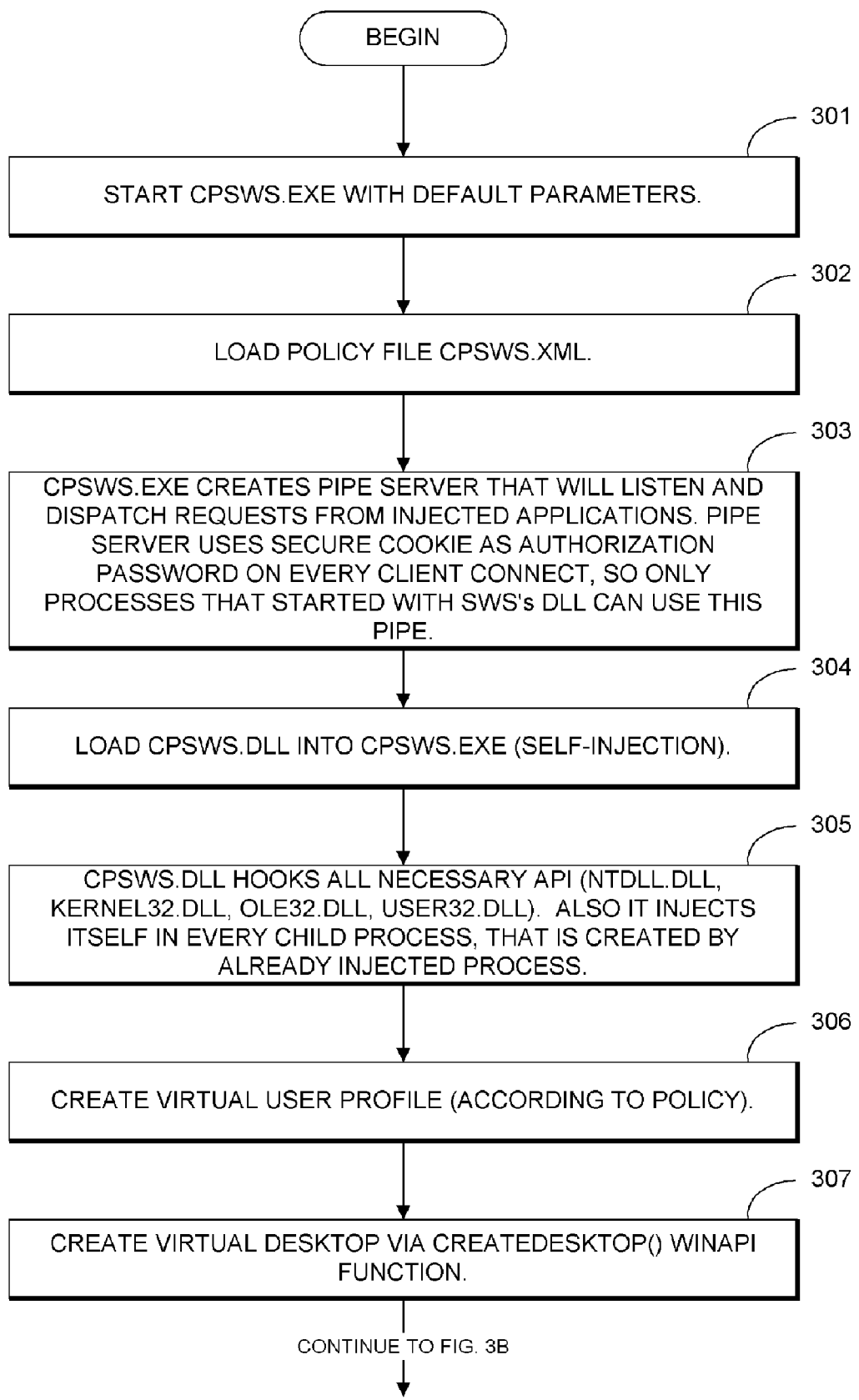
FIGS. 3A-B comprise a single high-level flowchart illustrating a methodology for initializing the secure desktop/workspace of the present invention.
Figure 3B:
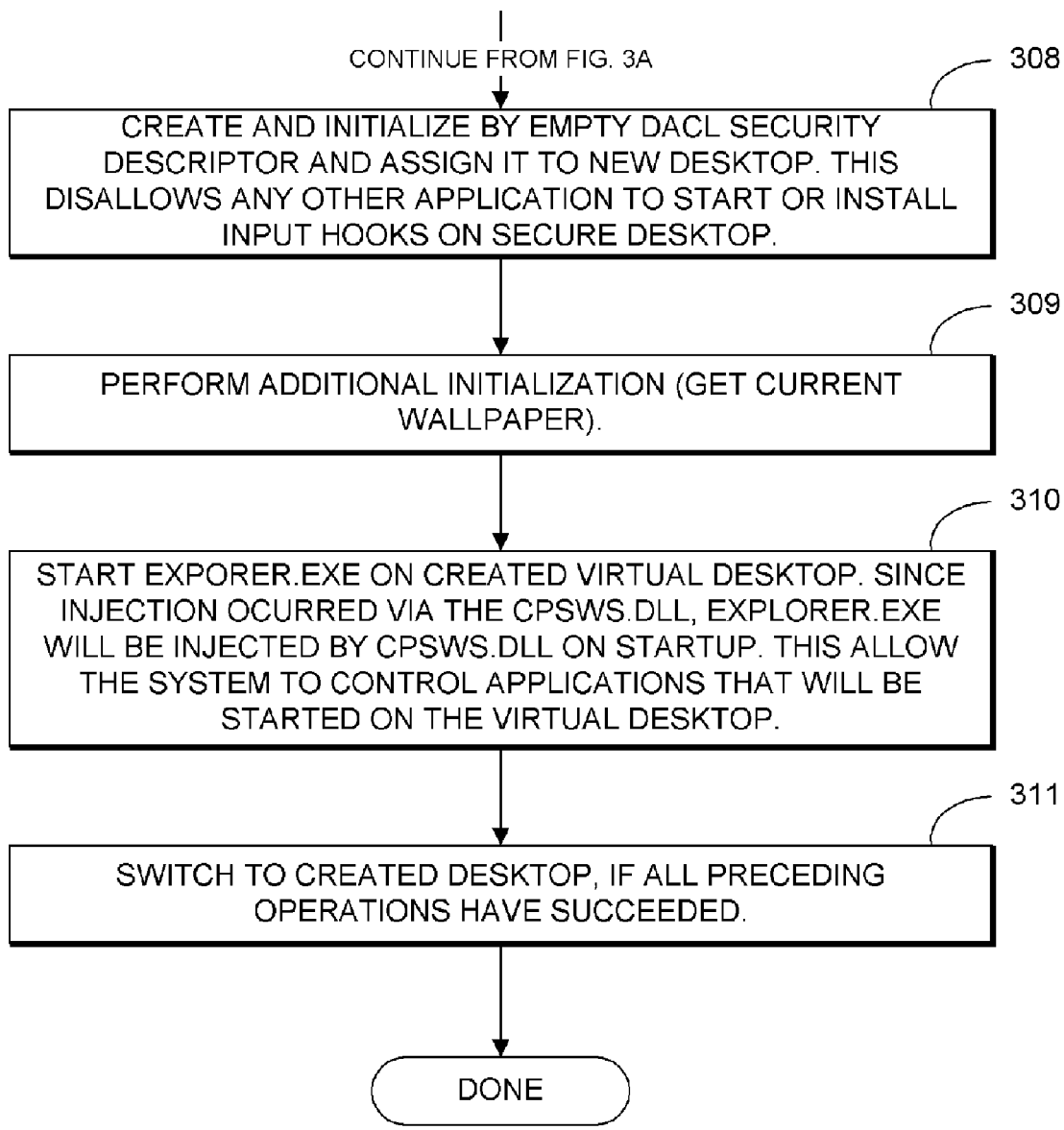

FIGS. 3A-B comprise a single high-level flowchart illustrating a methodology 300 for initializing the secure desktop/workspace of the present invention. At step 301, the secure workspace manager 227 (cpsws.exe) is started with the following parameters:

/url="main_page_url"—URL, that will be opened in default browser after secured desktop starts;

/cookie="server;cookiename=cookievalue"—secured cookie, that will be inserted into each HTTP(-S) request to the defined server; and /shell="shell_id"—shell identifier; refers to corresponding tag in the secured workspace policy; defines a shell that will be started on secure desktop (explorer.exe by default).

The policy file (cpsws.xml) may now be loaded, at step 302. At step 303, the secure workspace manager (cpsws.exe) creates a pipe server that will listen and dispatch requests from injected applications. The pipe server uses a secure cookie as an authorization password on every client connect, so only processes that started with the SWS's dll can use this pipe. Next, at step 304, the hooks engine 225 (cpsws.dll) is loaded into the SWS; this process is referred to herein as "self-injection." The hooks engine (cpsws.dll) hooks all necessary API (for example, for Windows: ntdll.dll, kernel32.dll, ole32.dll, user32.dll, and the like), and also injects itself into every child process that is created by an already-injected process. This is illustrated at step 305.

As shown at step 306, the method proceeds to create a virtual user profile (according to the policy), as follows:

Set files directory to: %USERPROFILE%\CPSecured;

Set Registry to: HKCU\ CPSecured;

Initialize shortcuts;

Import files from original profile; and

Create profile files for Mozilla Firefox.

At step 307, the method creates a virtual desktop, for example, via Windows' CreateDesktop( ) WinAPI function. The method proceeds, at step 308, to create and initialize an empty Discretionary Access Control List (DACL) security descriptor and assign it to the new desktop. This disallows any other application from starting or installing input hooks on the secure desktop. Any additional initialization may now be performed (e.g., get current wallpaper), as indicated at step 309. The machine's shell (e.g., explorer.exe) is started on the created virtual desktop, at step 310. Since injection occurred via the hooks engine (cpsws.dll), the shell (explorer.exe) will be injected by the hooks engine (cpsws.dll) on startup. This allows the system of the present invention to control applications that will be started on the virtual desktop. Finally, at step 311, the method 300 switches operation of the machine to the just-created desktop, if all preceding operations have succeeded.

API hooks (a) API Hooks Initialization (dll)

During processing of a Windows' DllMain function (i.e., the optional entry point into a Windows dynamic-link library (DLL)), the hooks engine (cpsws.dll) hooks to a list of functions of ntdll.dll, kernel32.dll, ole32.dll, and user32.dll (i.e., operating system applications programming interface (API) executable files). Then it waits while the parent process writes a secure cookie to its memory (e.g., using WriteMemory API). This allows the system of the present invention to further distinguish pipe clients in the SWS.

(b) API Hooks Processing (dll)

The API hooks processing proceeds as follows. Every created thread of the already-secured application is switched to the secure desktop. The desktop handle is retrieved from the hooks engine (cpsws.dll) using Windows DLL thread attachment program logic (i.e., specifying the Windows DLL_THREAD_ATTACH flag). The "process creation" functions (e.g., Windows' CreateProcessW, CreateProcessA functions) are hooked to allow injection of cpsws.dll at the point when a new process is going to start. When such a new process has been created, the hooks engine (cpsws.dll) writes a secure token to its memory. A child process may use this as an authorization password for the pipe server.

File functions are intercepted to allow "virtualization" and encryption of the file system, as follows. When an application asks the system to create file, the hooks engine (cpsws.dll) checks the file path in order to determine if creating a file in this directory is allowed by policy. If it is allowed, the secure workspace manager (cpsws.exe) generates a random string that will correspond to requested file name, thus allowing the file to be physically created with a secure name.

On write operation, the hooks engine (cpsws.dll) checks the user's rights to change files in the given target directory, according to the policy file. If sufficient rights exist, the SWS encrypts all data "on-the-fly" and writes it to a real file in secure form. Additional information is written to file, including for example encryption algorithm ID and real size of file (recorded as housekeeping information, for use with encryption algorithms that can encrypt data only by blocks with constant length). This additional data is not visible to the application, but is instead used by the hooks engine (cpsws.dll) internally.

On read operation, the hooks engine (cpsws.dll) reads information from the file header, and reads a corresponding fragment of data from the file (which can be larger than requests, due to block encryption). The file information may now be decrypted and returned as decrypted data to the requesting application. In response to a "files listing" request, the hooks engine (cpsws.dll) checks the user's rights to list the particular directory. If the user has sufficient rights, the SWS reads corresponding information from the file headers and returns the real filename and size (which recall was written as a field of the file header).

When an application creates a memory-mapped section of a file, the SWS creates a corresponding in-memory section, with size of file. The system may now read decrypted content of the file to this section and give the calling application (caller) a corresponding handle to this section. If an application specifies a "section name" in the call, the hooks engine (cpsws.dll) can change the name to separate sections created on the respective secure and default desktops. Desired behavior is preferably configured in the policy file (cpsws.xml). When an application calls usual ReadFile (Windows API function to read data from a file) or WriteFile (Windows API function to write data to a file) functions for files that are mapped to memory, the SWS satisfies the calls with simple read/write of data from section memory. When an application requests closing of the section, data stored in the section is flushed to the corresponding file and the section is closed.

De-Initialization of the Secure Desktop/Workspace

In response to a proper request, the SWS of the present invention may be shutdown. Before closing, it optionally queries all running applications for shutdown, terminates all secured application(s), and then deletes all secured data from local storages, to prevent information leaks and quits. (Specific method steps for effecting de-initialization are described in detail below.)

Security Analysis

The prevention of information leaks from the SWS will now be discussed.

System Swap File

The underlying operating system (OS) may save memory pages of applications running on secure desktop into a global system swap file. The SWS itself does not presently solve this problem in the currently preferred embodiment. However, the issue may be addressed by changes elsewhere. For example, the swap file itself may be written to an OS-supported volume encryption (e.g., Microsoft Windows Vista Windows full volume encryption). Additionally, in those deployments already employing large amounts of physical memory (RAM), the amount of data paged to disk for virtual memory management (VMM) may constitute a rather insignificant amount of application data. Further, those skilled in the art will appreciate that the SWS may be designed to include kernel-level logic to supplant the OS's native swap file with an encrypted one.

Registry Keys

In the currently preferred embodiment, the SWS does not encrypt registry entries created by applications on the secure desktop. These are deleted when a given session is terminated. However, it is possible that during unexpected session termination sensitive data will be left in the current user file (ntuser.dat). The issue may be addressed by encrypting registry items in the same way as files.

Analyzing Secure User Profile

Content and names of files created on the secure desktop are encrypted on the host file system. However, the corresponding encryption/decryption key is stored in memory (subject to swapping via the swap file); similarly, the directory structure is potentially visible outside the secure desktop. In embodiments contemplating use of electronic codebook (ECB) mode, there is the potential disadvantage that identical plaintext blocks are encrypted to identical ciphertext blocks; the approach does not hide data patterns. The issue may be addressed by using cipher-block chaining (CBC) mode. In the cipher-block chaining (CBC) mode, each block of plaintext is XORed with the previous ciphertext block before being encrypted. This way, each ciphertext block is dependent on all plaintext blocks up to that point. Further, use of a fully-virtual file system without correlation with host PC real file system provides additional protection.

Leaks Through Non-controlled API

Applications running on the secure desktop can exchange sensitive data through non-controlled API with non-secured applications on the default desktop (e.g., non-hooked out-of-process COM servers started by main system SVCHOST.EXE service). This issue may be addressed by hooking all API calls that can exchange sensitive information. In this manner, the SWS does not allow applications that can leak information to be started on the secure desktop.

Detailed Internal Operation

The following description presents method steps/program logic that may be implemented using processor-executable instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server).

Additional DLL Loader

The present invention includes an additional DLL loader that provides a mechanism to start new processes with forced loading of an additional DLL in the address space of the new process. This is done by creating a new process in suspended state, allocating a small memory location in its address space, and writing to it the code that loads the necessary DLL and that jumps to beginning of process execution code. The context of the main thread of the created process is then changed, so that the computer processor's instruction pointer register (e.g., Intel x86 Extended Instruction Pointer (EIP) register) points to this created code. The thread is now resumed. After resuming, the process' thread executes code that loads the necessary DLL into the process (space) and continues usual processing of executable code. This may be implemented as follows (e.g., illustrated by the following pseudocode snippets):

```
1: typedef struct DLL_LOADER_
2: {
3: unsigned char LoaderCode[LOADER_CODE_SIZE];
4: char DllPathName[MAX_PATH];
5: }DLL_LOADER, *PDLL_LOADER;
6:
7: void
8: AddAsmInstruction
9: (PBYTE &pTemp, int InstructionId, int InstructionOperand)
10: {
11: memcpy(pTemp, asm_instruction_code_table[InstructionId],
asm_instruction_code_size[InstructionId]);
12: pTemp += asm_instruction_code_size[InstructionId]
13: memcpy(pTemp, &InstructionOperand,sizeof(int));
14: pTemp += sizeof(int);
15: }
16:
17: void
18: StartProcessWithDll
19: (LPTCSTR pszProcessImage, LPTCSTR pszDllPathName)
20: {
21: STARTUPINFO si;
22: PROCESS_INFORMATION pi;
```

-continued

```
23: CreateProcess(pszProcessImage, pszProcessImage, NULL, NULL,
FALSE, CREATE_SUSPENDED, NULL, NULL, &si, &pi);
24: CONTEXT context;
25: GetThreadContext(pi.hThread, &context);
26: PVOID pDllLoaderRemote=VirtualAllocEx(pi.hProcess, NULL,
sizeof(DLL_LOADER), NEW_CODE,
PAGE_EXECUTE_READWRITE);
27: DLL_LOADER DllLoaderLocal;
28: strcpy(DllLoaderLocal.DllPathName,pszDllPathName);
29: PBYTE pTemp=(PBYTE)&pDllLoaderLocal;
30: AddAsmInstruction(pTemp, ASM_PUSH, pDllLoaderRemote +
LOADER_CODE_SIZE);//push pointer to DllPathName to stack
31: AddAsmInstruction(pTemp, ASM_CALL, &LoadLibrary);//call
LoadLibrary with pushed parameter
32: AddAsmInstruction(pTemp, ASM_JMP, context.eip);//jmp to original
process code
33: WriteProcessMemory(pi.hProcess, pDllLoaderRemote,
&pDllLoaderLocal, sizeof(pDllLoaderLocal), NULL);
34: context.eip = pDllLoaderRemote;
35: ResumeThread(pi.hThread);
36: }
```

Of particular interest, the AddAsmInstruction (helper) method call at line 30 serves to push a pointer to the DLL path name onto the current stack (e.g., x86 stack). Now, the helper method is again invoked at line 31 for purposes of calling the LoadLibrary (Windows API call) with the pushed parameter, thereby forcing the loading of the DLL (whose name is referenced at line 30). Then, at line 32, the helper method is invoked for purposes of effecting a jump (JMP instruction) back to the original process code.

Hooks Engine

The hooks engine provides a generic DLL that functions as an interception mechanism in its own processes. The basic approach is to overwrite part of the DLL code in memory, so that a given target function instead calls wrapper code immediately upon execution. Here, the start of the target DLL function is disassembled, with its old (original) code being saved in a newly allocated memory block. The original site of this code is overwritten with a simple jump (JMP) instruction that calls the wrapper function. In this manner, the wrapper function gains control, and can process the API call itself or call the original DLL function with optionally changed input parameters. Core functionality of the hooks engine may be implemented as follows (e.g., illustrated by the following pseudocode snippets):

```
1: typedef struct ORIGINAL_CALL_
2: {
3: unsigned char OriginalCode[MAX_ORIGINAL_CODE_SIZE];
4: unsigned char
JmpToOtherOriginalCode[asm_instruction_code_size[ASM_JMP]+sizeof(int)]
5: }ORIGINAL_CALL, *PORIGINAL_CALL;
6:
7: #define NOP_CODE 0x90
8:
9: void
10: HookDllFunction(LPTCSTR pszDllName, LPTCSTR pszFunctionName, PVOID
pFunctionWrapper, PVOID &pOriginalCall)
11: {
12: HMODULE hDll = GetModuleHandle(pszDllName);
13: PBYTE pFunction = GetProcAddress(hDll, pszFunctionName);
14: pOriginalCall = VirtualAlloc(NULL, sizeof(ORIGINAL_CALL), MEM_COMMIT,
PAGE_EXECUTE_READWRITE);
15:
16: int NeedSize = sizeof(ORIGINAL_CALL);
17: int ReplacedSize =
```

```
-continued

DisasmAndCalculateAsmIntstructionsSize(pOriginalCall, NeedSize);
18: memcpy(&pOriginalCall.OriginalCode,pFunction,ReplacedSize);//replaced
piece of instruction
19: memset(&pOriginalCall.OriginalCode + ReplacedSize, NOP_CODE,
MAX_ORIGINAL_CODE_SIZE - ReplacedSize);//fill not used space with NOP
instructions
20: AddAsmInstruction(&pOriginalCall.JmpToOtherOriginalCode, ASM_JMP,
pFunction + ReplacedSize);//generate jump to other real function code
21:
22: AddAsmInstruction(pFunction, ASM_JMP, pFunctionWrapper); //generate
jump to hook code in the beginning of DLL exported function
23: }
```

As shown, at line 18, the code performs a memory copy (memcpy) operation for overwriting the original code as described above. Unused byte locations are padded out with NOP (no operation) instructions (e.g., 0x90 bytes), as shown at line 19. At line 20, the AddAsmInstruction helper function is again invoked for generating a jump (instruction) to the other real function code, and at line 22 the helper function is invoked for generating a jump to hook code at the beginning of the DLL (exported) function.

File System Processing Engine

A file system processing engine of the present invention provides a mechanism for serving file system calls, such as files and directories enumeration, creating and deleting files, and reading and writing file data. When a secured application tries to read or write a user's profile files, it serves I/O requests, allowing on-the-fly encryption of file names and content. When the application tries to write to any restricted location (e.g., specified in policy), the engine prevents any unauthorized write or even access operations, returning an "Access Denied" error; in this manner, the SWS ensures that no private data is left on the system after the SWS is closed down. File content encryption is designed for use with block-ciphers in ECB mode, with the option of including salt (i.e., additional piece of information added to the hash) that can be dependent of data-offset. Private user's file names are similarly secured in a manner to allow both good security and fast accessing directories tree. When a given application creates a file (which must be secured), the engine parses the path, splits it into corresponding names components, and generates a random character string (corresponding to real names). The file is physically stored by path, which is combined from random-names components. When the application opens this file or tries to enumerate names of the secured file, the engine extracts the corresponding logical file names from an internal look-up table that is stored only in memory.

Memory-mapped file sections support can be considered as additional sub-functionality of the file system processing engine. When an application tries to create a file section in a secured file, the engine creates memory-stored section with corresponding attributes and decrypts the file's content to it. If the application specifies a section name during creation or opens an existing section by name, the engine can optionally change the section name to divide sections opened by applications on default and secured desktops. The particular section names that should be changed can be specified in policy. On every subsequent read/write request of the file, the engine performs simple copy of memory data from section memory to I/O buffer. Flushing of the section to physical storage occurs on closing the file's handle. The below two pseudocode samples illustrate program logic implementing file processing features.

The first sample illustrates program code from a ZwCreateFile wrapper that changes file name or analyzes requested access rights:

```
1:  NTSTATUS _stdcall _wrapperZwCreateFile(
2:      PHANDLE FileHandle,
3:      ACCESS_MASK DesiredAccess,
4:      POBJECT_ATTRIBUTES ObjectAttributes,
5:      PIO_STATUS_BLOCK IoStatusBlock,
6:      PLARGE_INTEGER AllocationSize,
7:      ULONG FileAttributes,
8:      ULONG ShareAccess,
9:      ULONG CreateDisposition,
10:     ULONG CreateOptions,
11:     PVOID EaBuffer,
12:     ULONG EaLength)
13: {
14:     NTSTATUS rv=STATUS_SUCCESS;
15:     bool need_original=true;
16:     if(_threads_lock.EnterThread(_LINE_))
17:     {
18:
19: //Extract file path name from ObjectAttribute structure, with
conversion of it to a long form if necessary
20:         std::string strFileName =
                ExtractLongPathName(ObjectAttributes);
21:
22: //Check is protection is enabled for current application
23:         if(_Module::g_ProtectedApplication != paUnknown)
24:         {
25: //Check for denied file path.
26:
27:             if
(g_module.get_protection( ).CheckForbiddenLocation(strFileName))
28:             {
29:                 _threads_lock.LeaveThread(0);
30:                 return STATUS_ACCESS_DENIED;
31:             }
32:
33:             std::string virtualFileName(strFileName);
34: //Check is this file should be secured (encrypted), with converting
its file path to the secured form if necessary
35:
36:             if(g_module.get_protection( ).IsProtectedFile(strFileName))
37:             {
38:                 need_original=false;
39:                 POBJECT_ATTRIBUTES
OurObjectAttributes=NameInitObjectAttributes(ObjectAttributes,
strFileName);
40:
41: //Call original ZwCreateFile with encrypted file path and some
    flags
modified (we always need read access to the file)
42:                 rv = _originalZwCreateFile(
43:                     FileHandle,
44:
DesiredAccess==
FILE_ALL_ACCESS?DesiredAccess:DesiredAccess|
FILE_READ_DATA,
45:                     OurObjectAttributes,
```

```
46:            IoStatusBlock,
47:            AllocationSize,
48:            FileAttributes,
49: FILE_SHARE_READ|FILE_SHARE_WRITE|FILE_SHARE_DELETE,//ShareAccess,//
50:            CreateDisposition,
51:            CreateOptions,
52:            EaBuffer,
53:            EaLength);
54:
55:
56:
57:            NameFreeObjectAttributes(OurObjectAttributes);
58:            if(rv==STATUS_SUCCESS)
59:            {
60: //Call CryptedFile::PostOpenInitalize routine, that perfoms initialization encryption header of file, if it doesn't have header yet
61:
62:                CryptedFile::PostOpenInitalize(*FileHandle,
                       strFileName);
63:                OurHandles::HNDINFO info;
64:                info.Flags=0;
65:                info.RefCnt=1;
66:                info.Name=StdStrToLower(virtualFileName);
67: //Store opened handle in our handles cache
68:                OurHandles::PutHandle(*FileHandle,info);
69:            }
70:        }else
71:        {
72: //if file is not encrypted, but can be opened for write by app then simple pass call to original ZwCreateFile
73:            if
(g_module.get_protection( ).CheckWritablePath(strFileName))
74:            {
75:
SWSUtils::EnsurePathExists(strFileName.substr(4,strFileName.size( )-4));
76:                rv = _originalZwCreateFile(
77:                    FileHandle,
78:                    DesiredAccess,
79:                    ObjectAttributes,
80:                    IoStatusBlock,
81:                    AllocationSize,
82:                    FileAttributes,
83:                    ShareAccess,
84:                    CreateDisposition,
85:                    CreateOptions,
86:                    EaBuffer,
87:                    EaLength);
88:                need_original=false;
89:            }else
90:            {
91: //if app tried to create file in read-only location, pass FILE_OPEN flag to ZwCreateFile routine to check if file already exist and return STATUS_OBJECT_NAME_COLLISION if this case or STATUS_ACCESS_DENIED, signaling app file is not exists, but app has no write access to specified location
92:                if(CreateDisposition==FILE_CREATE)
93:                {
94:                    rv = _originalZwCreateFile(
95:                        FileHandle,
96:                        DesiredAccess,
97:                        ObjectAttributes,
98:                        IoStatusBlock,
99:                        AllocationSize,
100:                       FileAttributes,
101:                       ShareAccess,
102:                       FILE_OPEN,
103:                       CreateOptions,
104:                       EaBuffer,
105:                       EaLength);
106:                   if(rv==STATUS_SUCCESS)
107:                   {
108:                       _originalZwClose(*FileHandle);
109:
rv=IoStatusBlock->Status=STATUS_OBJECT_NAME_COLLISION;
110:                   }else
111:                   {
112:                       g_logger->LogInfo("_wrapperZwCreateFile FILE_CREATE access denied for '%s'",strFileName.c_str( ));
113:                       rv=IoStatusBlock->Status=
                           STATUS_ACCESS_DENIED;
114:                   }
115:                   need_original=false;
116:               }else
117:               {
118:                   CreateDisposition=FILE_OPEN;
119:
120: //If app simple opens file, then adjust access rights as specified in policy
121:                   DesiredAccess=GetMaxAccess(strFileName,CreateOptions,
                       DesiredAccess);
122:               }
123:           }
124:
125:       }
126:   }
127:
128:   _threads_lock.LeaveThread(0);
129:
130: }
131:
132: if(need_original)
133:       rv = _originalZwCreateFile(
134:           FileHandle,
135:           DesiredAccess,
136:           ObjectAttributes,
137:           IoStatusBlock,
138:           AllocationSize,
139:           FileAttributes,
140:           ShareAccess,
141:           CreateDisposition,
142:           CreateOptions,
143:           EaBuffer,
144:           EaLength);
145:
146:   return rv;
147: }
148:
```

The second sample illustrates the processing of ZwWriteFile calls:

```
1: // Sample code that processes ZwWriteFile call (also from SWS):
2: NTSTATUS _stdcall _wrapperZwWriteFile(
3:     HANDLE FileHandle,
4:     HANDLE Event,
5:     PIO_APC_ROUTINE ApcRoutine,
6:     PVOID ApcContext,
7:     PIO_STATUS_BLOCK IoStatusBlock,
8:     PVOID Buffer,
9:     ULONG Length,
10:    PLARGE_INTEGER ByteOffset,
11:    PULONG Key)
12: {
13:    OurHandles::HNDINFO info;
14: //check is specified handle is stored in our handles cache, retrieve some info about it if so
15:    if(OurHandles::IsOurHandle(FileHandle,info))
16:    {
17: //check if memory-mapping section object was opened for this file, if so then copy data also to section address space
18: HANDLE SectionHandle=
OurSectionByName(SectionNameByFileName(info.Name), false);
19:        NTSTATUS rv;
20:        SyncUtils::WaitMutant(sect_mtx,INFINITE);
21:        if(SectionHandle)
22:        {
23:            OurHandles::HNDINFO sectioninfo;
```

-continued

```
24:         if(OurHandles::IsOurHandle(SectionHandle,sectioninfo))
25:         {
26:             IO_STATUS_BLOCK isb;
27:             FILE_POSITION_INFORMATION fpi={0,0};
28: _originalZwQueryInformationFile(FileHandle,&isb,&fpi,sizeof(fpi),
FilePositionInformation);
29:
30:             if(fpi.CurrentByteOffset.QuadPart<sectioninfo.ViewSize)
31:             {
32:                 DWORD
pos=ByteOffset?fpi.CurrentByteOffset.LowPart-sizeof(
VD_CRYPT_HEADER):ByteOffset->LowPart,len=Length;
33:                 if(len>(sectioninfo.ViewSize-pos))
34:                 {
35:                     len=(DWORD)sectioninfo.ViewSize-pos;
36:                 }
37:                 memcpy(((unsigned char
*)sectioninfo.PrimaryMapView)+pos,Buffer,len);
38:
39:             }
40:         }
41:     }
42:
43:     LARGE_INTEGER WriteOffset;
44:     if(!ByteOffset)
45:     {
46:         IO_STATUS_BLOCK isb;
47:         FILE_POSITION_INFORMATION fpi={0,0};
48: _originalZwQueryInformationFile(FileHandle,&isb,&fpi,sizeof(fpi),
FilePositionInformation);
49:         WriteOffset=fpi.CurrentByteOffset;
50:     }else
51: WriteOffset.QuadPart=
ByteOffset->QuadPart+sizeof(VD_CRYPT_HEADER);
52:
53: //call CryptedFile::WriteFile to perfom writing content with
encryption to physical file
54:         rv=CryptedFile::WriteFile(FileHandle, IoStatusBlock, Buffer,
Length,&WriteOffset,Key);
55:     /////////
56:         IO_STATUS_BLOCK isb;
57:         FILE_POSITION_INFORMATION fpi={0,0};
58: _originalZwQueryInformationFile(FileHandle,&isb,&fpi,sizeof(fpi),
FilePositionInformation);
59:         SyncUtils::ReleaseMutant(sect_mtx);
60:         if(Event)SetEvent(Event);
61:         return rv;
62:     }
63:
64: //pass call to original ZwWriteFile routine if specified handle is
unknown for us
65: return _originalZwWriteFile(FileHandle, Event, ApcRoutine,
ApcContext,
66:         IoStatusBlock, Buffer, Length, ByteOffset, Key);
67: }
```

Synchronization Objects Virtualization

A synchronization objects virtualization engine is provided that can optionally change names of named synchronization objects (mutexes, semaphores, events, and the like) that are created by secured applications, thus allowing independent applications to function on secure and default desktops. For example, Adobe Acrobat Reader (acrord32.exe) creates certain named objects, the existence of which it uses to whether an instance of the Reader is already running (and thus a second instance should not be started). The specification of its names in the policy (XML) file makes possible to ensure acrord32.exe is the only running application instance in system.

Registry Processing Engine

A Registry processing engine is provided that allows flexible virtualization and protection of selected registry keys (which can be customized in the policy). Write-protection of selected keys is done by analyzing parameters of ZwCreateKey and ZwOpenKey routines and returning "Access Denied" status, if any modification access is requested. Virtualization is done by creating an additional registry subkey (HKCU\CPSecured) and changing all absolute paths requested by secured applications to really point to this key. Also a Copy-On-Access feature is provided to allow access to registry keys and values without noticeable delays for importing values from the original keys.

Exemplary wrapper code, ZwCreateKey, may be implemented as follows:

```
1: NTSTATUS _stdcall _wrapperZwCreateKey(PHANDLE
KeyHandle,ACCESS_MASK DesiredAccess,
2:             POBJECT_ATTRIBUTES ObjectAttributes,ULONG
                TitleIndex,
3:             PUNICODE_STRING Class,ULONG
CreateOptions,PULONG Disposition)
4: {
5: //check is protection enabled for current application
6:     if((_Module::g_ProtectedApplication !=
paUnknown)&&_threads_lock.EnterThread(_LINE_))
7:     {
8:         std::string
keypath=UNCStr2String(ObjectAttributes->ObjectName);
9:         std::string lkeypath=StdStrToLower(keypath);
10:
11:        NTSTATUS rv;
12: // TranslateHKEY routine checks is specified path belongs to HKCU
hive, converting it to virtual key path and returning true in this
case, if path is read-only HKLM path it return false and don't change
key path
13:        bool
mode=RegUtils::TranslateHKEY(ObjectAttributes->
RootDirectory,keypath);
14:        if(mode)
15:        {
16: //if path is points to virtualized key, then call original
ZwCreateKey routine with path, relative to HKCU\CPSecured location
17:            POBJECT_ATTRIBUTES
OurObjectAttributes=NameInitObjectAttributes(ObjectAttributes,
keypath);
18:            OurObjectAttributes->RootDirectory=NULL;
19:
20:
rv=_originalZwCreateKey(KeyHandle,DesiredAccess,
OurObjectAttributes,TitleIndex,Class,CreateOptions,Disposition);
21:
22:            NameFreeObjectAttributes(OurObjectAttributes);
23:        }else
24:        {
25: //if path is read-only and app tried to get write access to this key
then just return access denied to it
if((DesiredAccess&KEY_SET_VALUE)||(
DesiredAccess&KEY_CREATE_SUB_KEY)||
((DesiredAccess&KEY_ALL_ACCESS)==
KEY_ALL_ACCESS))
26:            {
27:                _threads_lock.Leave-
                    Thread(STATUS_ACCESS_DENIED);
28:                return STATUS_ACCESS_DENIED;
29:            }
30:
31:            DesiredAccess=KEY_READ;
32:
33: //call original ZwCreateKey routine for read access
34:
rv=_originalZwCreateKey(KeyHandle,DesiredAccess,ObjectAttributes,
TitleIndex,Class,CreateOptions,Disposition);
35:
36:        }
37:
```

-continued

```
38:        _threads_lock.LeaveThread(rv);
39:        return rv;
40:      }else
41:      return
_originalZwCreateKey(KeyHandle,DesiredAccess,ObjectAttributes,
TitleIndex,Class,CreateOptions,Disposition);
42:   }
```

For example, beginning with the program logic at line 6 the function checks whether protection is enabled for current application (under consideration). At line 13, the TranslateHKEY routine is invoked to check whether the specified path belongs to HKCU (HKEY_CURRENT_USER) hive. If so, the routine converts it to a virtual key path and returns "true." If the path is read-only (HKLM (HKEY_LOCAL_MACHINE) path), the routine returns "false" and the key path remains unchanged. At line 17, if the path points to a virtualized key, then the original ZwCreateKey routine is called with the path (relative to the HKCU\CPSecured location). At line 25, if the path is read-only and the application tries to get write access to this key, the program logic returns "Access Denied" (for denying access to the key). Line 34 demonstrates a call to the original ZwCreateKey routine, for providing read access.

OLE32 Calls Filtering

OLE32 calls filtering is provided to intercept the OS' COM server's creation requests. When an application asks OLE32 to create an out-of-process COM server, the wrapper checks the COM server presence in the SWS. The path is extracted to an executable image of the COM server from the registry HKCR (HKEY_CLASSES_ROOT) hive. The server starts itself, if the server was not already started before. Such an approach allows the starting of secured COM servers. The following program logic illustrates main aspects of this functionality:

```
1:  bool Ole32APIWrapper::CheckIsServerStarted(std::string server)
2:  {//this function checks if specified image process is already started
in secured mode, if so we don't need to start it one more time
3:      bool out=false;
4:      typedef std::set<DWORD> PROCSET;
5:      PROCSET procs;
6:      HANDLE snt =
         CreateToolhelp32Snapshot(TH32CS_SNAPPROCESS,0);
7:      if(snt!=INVALID_HANDLE_VALUE)
8:      {
9:         PROCESSENTRY32 pe32={sizeof(PROCESSENTRY32),0};
10:
11: //prepare full list of active secured processes
12:        if(Process32First(snt,&pe32))
13:        {
14:          do {
15:
if(VDPipeClient::IsPidSecured(pe32.th32ProcessID))procs.insert(pe32.
th32ProcessID);
16:          } while(Process32Next(snt,&pe32));
17:        }
18:        CloseHandle(snt);
19:     }
20:
21:
22:     std::string ShortServer = StdStrToLower(ShortPathName(server));
23:
24: //compare image path names of secured processes with requested
path, if found matching path - return true, else - return false
25:
26:     for(PROCSET::iterator i=procs.begin( );i!=procs.end( );++i)
27:     {
28:        ics::handle prc=
           OpenProcess(PROCESS_ALL_ACCESS,FALSE,*i);
29:        std::vector<HINSTANCE> modarray(255);
30:        DWORD needsize=sizeof(HINSTANCE)*modarray.size( );
31:        BOOL
modenumok=EnumProcessModules(prc,&modarray[0],
needsize,&needsize);
32:        if(needsize>(sizeof(HINSTANCE)*modarray.size( )))
33:        {
34:           needsize+=512;
35:           modarray.resize(needsize/sizeof(HINSTANCE));
36:
modenumok=
EnumProcessModules(prc,&modarray[0],needsize,&needsize);
37:        }
38:        if(!modenumok)
39:           continue;
40:
41:        needsize/=sizeof(HINSTANCE);
42:        for(size_t j=0;j<needsize;j++)
43:        {
44:           char modpath[MAX_PATH+1];
45:           DWORD
modlen=GetModuleFileNameEx(prc,modarray[j],modpath,MAX_PATH);
46:           if(modlen&&(modlen<=MAX_PATH))
47:           {
48:             std::string
CurServer=StdStrToLower(ShortPathName(std::string(modpath,modlen)));
49:             if(ShortServer == CurServer)
50:             {
51:                out = true;
52:                break;
53:             }
54:          }
55:        }
56:
57:     }
58:     return out;
59: }
60: ......
61: bool Ole32APIWrapper::CreateLocalServer(std::string server)
62: {
63: //check if server already started, in this case do nothing
64: if(EnsureServerStartedAndInjected(server))
65:       return true;
66:
67:     STARTUPINFO si ={sizeof(STARTUPINFO),0};
68:     PROCESS_INFORMATION pin={0};
69:     std::string cmd("\"");
70:     cmd.append(server);
71:     cmd.append("\" -Embedding");
72: //start COM server process with -Embedding parameter
73:
if(CreateProcess(server.c_str( ),(char*)cmd.c_str( ),NULL,NULL,
FALSE,0,NULL,NULL,&si,&pin))
74:     {
75:        WaitForInputIdle(pin.hProcess,5000);
76:        Sleep(500);
77:        CloseHandle(pin.hProcess);
78:        CloseHandle(pin.hThread);
79:     }
80:     return true;
81: }
```

The CheckIsServerStarted function checks whether the specified image process is already started in secured mode (so that is not necessary to start it one more time). At line 14, a "do/while" loop is established to prepare a full list of active secured processes. At line 26, a "for" loop compares the image path names of secured processes with the requested path. If the comparison finds a matching path, the program logic returns "true"; otherwise, it returns "false." If the server is already started (tested at line 64), then the function does no additional work and simply returns "true." Otherwise, the function proceeds to start the COM server process with embedding parameter.

Exemplary ole32.dll wrappers that intercept attempts to create COM servers may be constructed as follows:

```
1: .................
2: //ole32.dll wrappers, that intercepts/attempts to create COM servers
3: bool Ole32APIWrapper::CreateLocalServer(REFCLSID rclsid)
4: {
5:    std::string strServerName = Ole32APIWrapper::ServerByCLSID(rclsid);
6:    if (!strServerName.empty())
7:    {
8:       return Ole32APIWrapper::CreateLocalServer(strServerName);
9:    }
10:   return true;
11: }
12: .............
13: HRESULT _stdcall _wrapperCoCreateInstanceEx(
14:    REFCLSID rclsid,
15:    IUnknown * punkOuter,
16:    DWORD dwClsCtx,
17:    COSERVERINFO * pServerInfo,
18:    ULONG cmq,
19:    MULTI_QI * pResults)
20: {
21:    if(!Ole32APIWrapper::CreateLocalServer(rclsid))
22:       return E_NOINTERFACE;
23:
24:    HRESULT rv = _originalCoCreateInstanceEx(rclsid, punkOuter, dwClsCtx, pServerInfo, cmq, pResults);
25:
26:    if (_Module::g_ProtectedApplication != paUnknown)
27:    {
28:       Ole32APIWrapper::TraceObjectNameByCLSID(rclsid, "CoCreateInstanceEx");
29:       Ole32APIWrapper::CatchLocalServer(rclsid);
30:    }
31:
32:    return rv;
33: }
```

Clipboard Processing Engine

A "Clipboard" processing engine is provided to serve as a mechanism to intercept saving data to and retrieving data from the OS' clipboard by secured application(s), thereby allowing on-the-fly encryption of private data stored to clipboard. In Windows OS, for example, this can be achieved by intercepting only three functions—GetClipboardData, SetClipboardData and CloseClipboard—that are exported by Windows' user32.dll. For example, a GetClipboardData wrapper may be implemented as follows:

```
1: HANDLE __stdcall _wrapperGetClipboardData( UINT uFormat)
2: {
3:    return globalDecrypt(_originalGetClipboardData(uFormat));
4: }
```

As shown, this works in conjunction with a globalDecrypt function to decrypt The data for reconstituting the original Clipboard data. The globalDecrypt function itself may be constructed as follows:

```
1: HANDLE globalDecrypt(HANDLE src)
2: {
3:    if(!src)return src;
4:    size_t sz=GlobalSize(src);
5:    if(sz<2)return src;
6:
7:    char *sbuff=(char *)GlobalLock(src);
8:    if(!sbuff)return src;
9:    HANDLE out=src;
10:   if((sbuff[0]==0x07)&&(sbuff[1]==0x10))
11:   {
12:      unsigned int dstlen=0;
13:      VDCryptUtils::DecryptRAWBufferFromString(sbuff+2, sz-2, NULL, dstlen);
14:
15:      if(dstlen)
16:      {
17:         out=GlobalAlloc(GMEM_MOVEABLE,dstlen);
18:         char *dbuff=(char *)GlobalLock(out);
19:         VDCryptUtils::DecryptRAWBufferFromString(sbuff+2, sz-2, dbuff, dstlen);
20:         GlobalUnlock(out);
21:      }
22:   }
23:   GlobalUnlock(src);
24:   return out;
25: }
```

Print Interceptor

A print interceptor engine is provided to hook the Windows StartDocW and StartDocA functions exported by gdi32.dll. These StartDoc functions start a print job in Windows. By intercepting these functions, the SWS may deny any print operations. Additionally, the feature can be configured by the policy file.

Process Creation Interceptor

A process creation interceptor is also provided. When a secured application tries to create a new process, it executes hooking engine code that hooks all necessary API calls of the created child process. It also writes some secure data (secure token) directly to memory of the created process that allows the SWS to further distinguish between a secured application and malicious applications (which may try to use SWS functionality to access secured data). Sample pseudocode, illustrating main features of process creation wrapper, is as follows:

```
1: BOOL WINAPI _wrapperCreateProcessW
2: (
3: wchar_t *lpApplicationName,      // name of executable module
4: wchar_t *lpCommandLine,          // command line string
5: LPSECURITY_ATTRIBUTES lpProcessAttributes, // SD
6: LPSECURITY_ATTRIBUTES lpThreadAttributes,  // SD
7: BOOL bInheritHandles,            // handle inheritance option
8: DWORD dwCreationFlags,           // creation flags
9: LPVOID lpEnvironment,            // new environment block
10: wchar_t *lpCurrentDirectory,    // current directory name
11: LPSTARTUPINFOW lpStartupInfo,   // startup information
12: LPPROCESS_INFORMATION lpProcessInformation
// process information
13: )
14: {
15: if (!CheckPolicyExecAllowed (lpApplicationName))
16: {
17: SetLastError(ERROR_ACCESS_DENIED);
18: ShowAlert("Execute denied by policy");
19: return FALSE;
20: }
21:
22: BOOL bRes = StartProcessWithDll(lpApplicationName, CpSwsDllPathName, lpStartupInfo,lpProcessInformation);
23: if(!bRes)return FALSE;
24:
25: PVOID remoteSecureCookiePtr = GetRemoteSecureCookiePtr(lpProcessInformation->hProcess);
26: WriteProcessMemory(lpProcessInformation->hProcess, remoteSecureCookiePtr,&SecureCookie,sizeof(SecureCookie),NULL);
27: return TRUE;
28: }
```

Importantly, if the policy does not allow the executable, then the function returns "false" at line 19. Otherwise, the function will proceed to allow process creation (at line 22).

Encryption

Encryption functionality implemented in the present invention is designed to be flexible and easy to configure. It allows, for example, the use of different cryptographic algorithms for encrypting objects of a given type. The particular encryption algorithm used is noted (via a stored ID) in the stored object, via an opaque header. The header also stores other housekeeping information, such as real data length. In the currently preferred embodiment, encryption functionality is implemented using the following interface:

```
1: class IVDCrypt
2: {
3: public:
4:    virtual bool EncryptBuffer(char *Buffer, unsigned __int64 Offset,unsigned int Length)=0;
5:    virtual bool DecryptBuffer(char *Buffer, unsigned __int64 Offset,unsigned int Length)=0;
6:    virtual unsigned int Align()=0;
7: };
```

Every time engine functionality requests to encrypt or decrypt some blocks of data, the engine creates an instance (of implementation) of the particular preferred crypto algorithm, by giving the preferred algorithm ID to the encryption engine. If the engine detects that data is not encrypted yet, it will proceed to use the specified algorithm. If data is already encrypted, however, the engine will use the algorithm ID that is specified in encrypted data header. The particular encryption key employed is currently randomly generated, on session initialization.

URL Secure Cookie Injector

A URL secure cookie injector is provided for injecting a variable count of secure cookies into HTTP requests. Thus, the SWS can inject one or more additional secure cookies into every secured process using the Windows' InternetSetCookie API function. The SWS also creates Mozilla Firefox profile files with secure cookies during initialization. HTTP URL and corresponding secure cookie data is given to the secure workspace manager (cpsws.exe) by the launcher, as command-line parameters. The manager (cpsws.exe) cleans up the command-line after startup to prevent leaking of this information. This allows the corresponding HTTP server of the enterprise portal to distinguish HTTP requests from secured and unsecured applications (e.g., using GWLIB API).

Configuration Loader

A configuration loader (with storage class) is provided that loads and analyzes the policy (cpsws.xml file), in which configuration and policy settings are stored. The loader provides an interface for other functionality parts to access their policies and configuration. It is possible to configure in the XML file what registry keys should be initialized and what values they should have for the SWS environment.

Inter-process Communication (IPC) Channel

An inter-process communication (IPC) channel is provided to serve as a generic mechanism for low-level safe and secure communication between SWS functionality parts loaded into different processes. It is implemented as a pipe server that is started in the cpsws.exe core process on the early stage of initialization; given pipe clients that connect to the server from cpsws.dll instances are loaded into secured applications. The server expects a secure token as the first data sent from a given client via pipe. If it receives any other data, it closes the pipe connection after waiting a prescribed period of time (as an anti-hacker delay). A secure token is written directly to secured process memory on its creation, so no one else can use the IPC channel/engine.

Desktop Initialization and Security

Desktop initialization and security uses the Windows' CreateDesktop API both with NT security features to achieve maximum possible control of user-space prevention, and to prevent keyboard loggers and screen-shooters from accessing private information. The CreateDesktop API function creates a new desktop, associates it with the current window station of the calling process, and assigns it to the calling thread. The virtual desktop, which is created by the CreatesDesktop API function, can be optionally equipped with special Security Descriptor that ensures no one can launch an application on the secured desktop or install a keyboard hook into it (and even make it impossible to get a desktop handle to this desktop). During initialization the manager (cpsws.exe) creates a desktop and assigns to it security descriptor with an empty DACL. The security descriptor creation and initialization code may, for example, be implemented along the following lines:

```
1: void DesktopSecurity::Secure( )
2: {
3:    PSECURITY_DESCRIPTOR sd=(PSECURITY_DESCRIPTOR)new char[0xffff];
4:    InitializeSecurityDescriptor(sd,SECURITY_DESCRIPTOR_REVISION);
5:    ACL a;
6:    if (InitializeAcl(&a,sizeof(ACL),ACL_REVISION)&& IsValidAcl(&a))
7:    {
8:        ApplySD(sd);
9:        SECURITY_INFORMATION si=DACL_SECURITY_INFORMATION;
10:        SetSecurityDescriptorDacl(sd,TRUE,&a,FALSE);
11:        ApplySD(sd);
12:    }
13:    delete[ ] (char *)sd;
14: }
15:
16: // ...
17:
18: void DesktopSecurity::ApplySD(PSECURITY_DESCRIPTOR sd)
19: {
20:    SECURITY_INFORMATION si=DACL_SECURITY_INFORMATION;
21:    SetUserObjectSecurity(_desk,&si,sd);
22: }
```

User and application specific initialization routines

Since the SWS performs HKCU hive and user's profile virtualization, it is possible to enforce some user-interface predefinitions for applications running under SWS. Examples include disabling or extending some shell features, adding configuration shortcuts on Desktop or Start Menu, importing some files from the original profile, and the like. Also, the SWS performs automatic changing of desktop background wallpaper when switching from default desktop to secured one and vice versa.

Additional User-interface Features

After creating a virtual desktop, the SWS creates notification area (tray) icons both on secured and default desktops. These icons allow switching between desktops and closing of the SWS. The notification icon on the secure desktop is used also to display some user information messages and security warnings (e.g., as information balloons). The SWS draws a special icon on the right side of titles for all secured applications, to provide user feedback/psychological conviction that he or she is working in a secure workspace.

De-initialization

Figure 4:
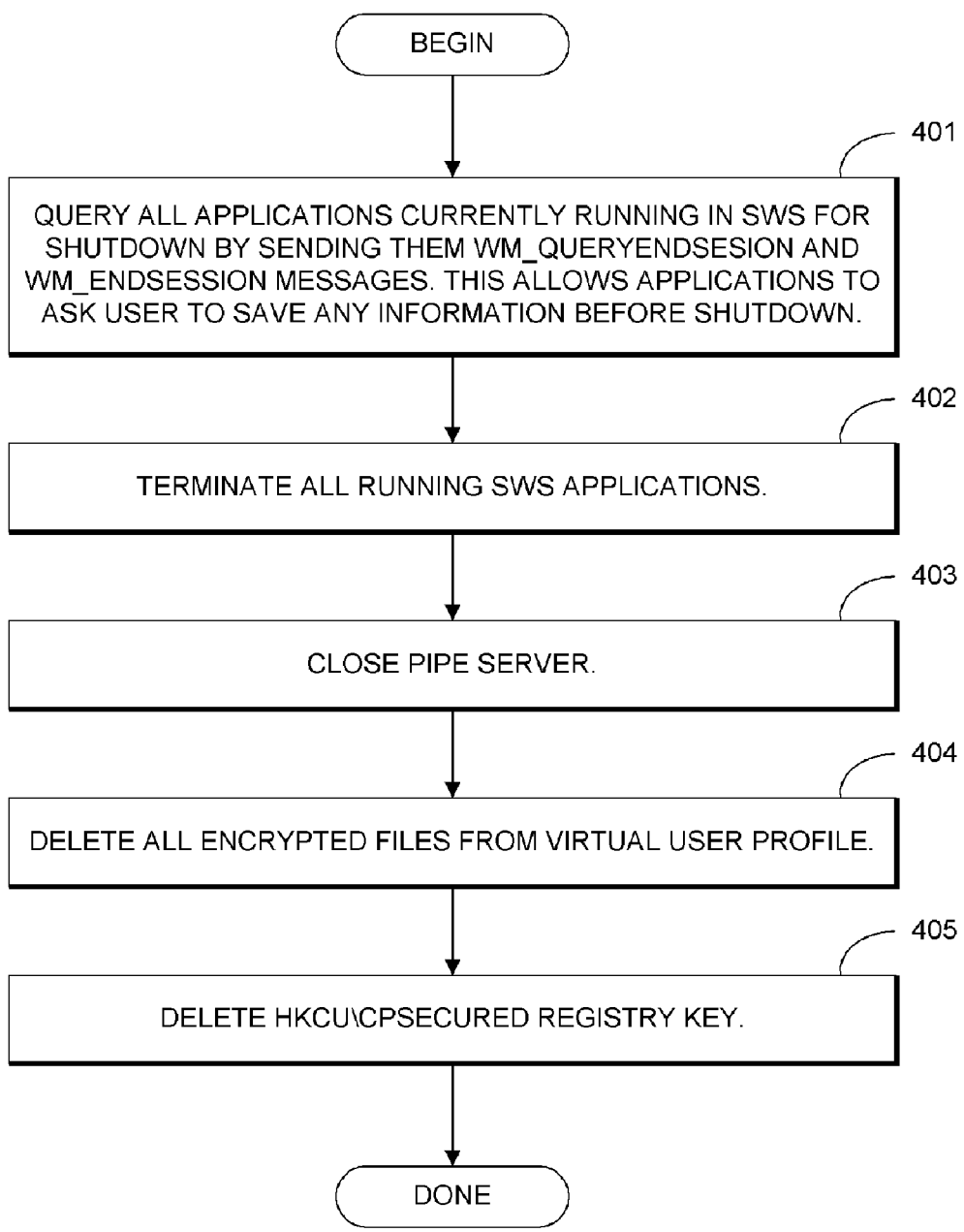
FIG. 4 is a high-level flowchart illustrating a method of the present invention for de-initialization.

On the exit command (that can be given directly from the notification icon menu or by ExitWindowsEx API call invoked from any secured application), the SWS starts the de-initialization procedure or method. FIG. 4 is a flowchart illustrating a method 400 of the present invention for de-initialization. At step 401, the method queries all applications currently running in the SWS for shutdown, by sending them WM_QUERYENDSESION and WM_ENDSESSION messages. This allow applications to ask the user to save any information before shutdown. Next, at step 402, all running SWS applications are terminated. The pipe server is closed at step 403, and all encrypted files are deleted from virtual user profile at step 404. Finally, at step 405, the method 400 concludes by deleting HKCU\CPSecured registry key.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. In a computer system, a method for creating a secured workspace within an existing operating system for allowing users to run applications in a secured manner, the method comprising:
   creating a policy for configuring the secured workspace, the policy specifying how information created during operation of the applications may be accessed;
   hooking particular functions of the operating system in order to obtain control over the information created during operation of the applications;
   during operation of the applications, encrypting the information to prevent unauthorized access;
   in response to a request for access to the information, determining whether the request complies with the policy; and
   if the request complies with the policy, satisfying the request by providing access to a decrypted copy of the information.

2. The method of claim 1, wherein the particular functions of the operating system include input/output (I/O) functions.

3. The method of claim 2, wherein the I/O functions include file services of the operating system.

4. The method of claim 1, wherein said hooking step occurs in a manner that is transparent to the applications.

5. The method of claim 1, further comprising:
   displaying user feedback for indicating that the applications are running in a secured manner.

6. The method of claim 5, wherein the user feedback includes distinctive computer desktop wallpaper.

7. The method of claim 1, wherein said hooking step occurs in a manner that is transparent to users.

8. The method of claim 1, wherein said information includes session information generated during operation of the applications.

9. The method of claim 1, wherein the secured workspace operates within the existing operating system in a manner that allows users to easily switch back to an existing unsecured workspace of the operating system.

10. The method of claim 1, wherein the secured workspace operates within user-space mode of the operating system, without requiring device drivers.

11. The method of claim 1, wherein the policy specifies actions of the applications that are permitted and are not permitted.

12. The method of claim 11, wherein the policy specifies certain banned programs that are not permitted to run in the secured workspace.

13. The method of claim 12, wherein said banned programs include malicious software.

14. A computer-readable medium having processor-executable instructions for performing the method of claim 1.

15. The method of claim 1, further comprising:
   downloading a set of computer-executable instructions for performing the method of claim 1 on a computer having a processor and a memory.

16. A computer system providing a secured workspace for allowing users to run applications in a secured manner, the system comprising:
   a computer running under control of an existing operating system;
   a policy for configuring the secured workspace, the policy specifying how information created during operation of the applications may be accessed;
   a module for intercepting particular functions of the existing operating system in order to allow the secured workspace to run under the existing operating system, said module permitting the secured workspace to obtain control over the information created during operation of the applications;
   an encryption module for preventing unauthorized access to the information; and
   a decryption module for providing authorized access to the information, in response to receiving a request that complies with the policy.

17. The system of claim 16, wherein the particular functions of the operating system include input/output (I/O) functions.

18. The system of claim 17, wherein the I/O functions include file services of the operating system.

19. The system of claim 16, wherein the module for intercepting operates in a manner that is transparent to the applications.

20. The system of claim 16, further comprising:
   displayable user feedback for indicating that the applications are running in a secured manner.

21. The system of claim 20, wherein the user feedback includes distinctive computer desktop wallpaper.

22. The system of claim 16, wherein the module for intercepting operates in a manner that is transparent to users.

23. The system of claim 16, wherein said information includes session information generated during operation of the applications.

24. The system of claim 16, wherein the secured workspace operates within the existing operating system in a manner that allows users to easily switch back to an existing unsecured workspace of the operating system.

25. The system of claim 16, wherein the secured workspace operates within user-space mode of the operating system, without requiring device drivers.

26. The system of claim 16, wherein the policy specifies actions of the applications that are permitted and are not permitted.

27. The system of claim 26, wherein the policy specifies certain banned programs that are not permitted to run in the secured workspace.

28. The system of claim 27, wherein said banned programs include selected ones of spyware and computer virus software.

29. The system of claim 16, wherein the particular functions of the operating system include clipboard functions.

30. The system of claim 16, wherein the information includes registry information created during operation of the applications.

31. A system providing a secured desktop environment that allows users to run application software securely, the system comprising:
- a computer running under an operating system, said computer including application software for use by users; and
- a secured desktop environment comprising:
- a configurable policy specifying permitted operations of the application software and specifying permitted access to information created during operation of the application software;
- a hooks engine for intercepting particular calls to the operating system, thereby allowing the secured desktop environment to control operations of the application software and control access to information created during operation of the application software; and
- a module, operating in conjunction with said policy and said hooks engine, for encrypting the information created during operation of the application software, and for preventing any operation of the application software that is not permitted and any access to the information that is not permitted, wherein said module provides access to a decrypted copy of the information in response to receiving a request for access to the information that complies with the policy.

32. The system of claim 31, wherein the particular calls to the operating system include input/output (I/O) API (application programming interface) functions.

33. The system of claim 32, wherein the I/O API functions include file services of the operating system.

34. The system of claim 31, wherein the hooks engine operates in a manner that is transparent to the application software.

35. The system of claim 31, further comprising:
- displayable user feedback for indicating that the application software is running in a secured manner.

36. The system of claim 35, wherein the user feedback includes distinctive computer desktop wallpaper.

37. The system of claim 31, wherein the hooks engine operates in a manner that is transparent to users.

38. The system of claim 31, wherein said information includes session information generated during operation of the application software.

39. The system of claim 31, wherein the secured desktop environment operates within the operating system in a manner that allows users to easily switch back to an existing unsecured desktop environment of the operating system.

40. The system of claim 31, wherein the secured desktop environment operates within user-space mode of the operating system, without requiring device drivers.

41. The system of claim 31, wherein the policy specifies actions of the application software that are permitted and are not permitted.

42. The system of claim 31, wherein the particular calls to the operating system include clipboard functions.

43. The system of claim 31, wherein the information includes registry information created during operation of the application software.

44. The system of claim 31, wherein said module for preventing includes:
- an encryption module for preventing unauthorized access to the information.

45. The system of claim 31, wherein said module for preventing includes:
- a decryption module for providing access to the information that is permitted pursuant to the policy.

* * * * *